United States Patent
Kruys et al.

(10) Patent No.: US 8,014,787 B2
(45) Date of Patent: Sep. 6, 2011

(54) SYSTEM AND METHOD FOR DISCRIMINATING RADAR TRANSMISSIONS FROM WIRELESS NETWORK TRANSMISSIONS AND WIRELESS NETWORK HAVING RADAR-AVOIDANCE CAPABILITY

(75) Inventors: Jan P. Kruys, Harmelen (NL); Amiram Levi, Hilversum (NL)

(73) Assignee: Agere Systems Inc., Allentown, PA (US)

( * ) Notice: Subject to any disclaimer, the term of this patent is extended or adjusted under 35 U.S.C. 154(b) by 937 days.

(21) Appl. No.: 10/636,429

(22) Filed: Aug. 7, 2003

(65) Prior Publication Data
US 2005/0032524 A1    Feb. 10, 2005

(51) Int. Cl.
*H04W 4/00*   (2009.01)
(52) U.S. Cl. ............ 455/454; 455/424; 455/67.13; 455/39; 455/442; 342/162; 342/159; 340/571
(58) Field of Classification Search .......... 455/454, 455/114.2, 424, 67.13, 69, 442; 342/159, 342/162; 340/571
See application file for complete search history.

(56) References Cited

U.S. PATENT DOCUMENTS

| | | | |
|---|---|---|---|
| 6,697,013 B2 * | 2/2004 | McFarland et al. | 342/159 |
| 2003/0107512 A1 | 6/2003 | McFarland et al. | |
| 2003/0214430 A1 * | 11/2003 | Husted et al. | 342/57 |

FOREIGN PATENT DOCUMENTS

EP    1 248 477 A1    10/2002

OTHER PUBLICATIONS

"Joint Rapporteur Group 8A-9B—Working Document Towards a Preliminary Draft New Recommendation on Dynamic Frequency Selection in 5GHz RLANS"; IEEE P802 Radio Regulations 01/026r2, 2001, pp. 1-40 XP-002304581.

\* cited by examiner

*Primary Examiner* — Pierre-Louis Desir

(57) ABSTRACT

For use in a wireless network, systems and methods for identifying radar signals and for giving the wireless network a radar-avoidance capability. The system for identifying radar signals includes: (1) a pulse analyzer, associated with a wireless device, configured to make a determination whether a received pulse is a radar pulse and not a wireless network pulse and (2) a pulse reporter configured to generate, if the determination is positive, a report thereof for transmission over the wireless network. Another system gives the wireless network a radar-avoidance capability and includes: (1) a report receiver configured to receive reports via the wireless network from wireless devices thereof and (2) a report analyzer, associated with the report receiver, configured to analyze relationships among the reports to make a determination whether a sequence of radar pulses exists and, if the determination is positive, generate a radar transmission alert.

16 Claims, 4 Drawing Sheets

SYSTEM AND METHOD FOR DISCRIMINATING RADAR TRANSMISSIONS FROM WIRELESS NETWORK TRANSMISSIONS AND WIRELESS NETWORK HAVING RADAR-AVOIDANCE CAPABILITY

TECHNICAL FIELD OF THE INVENTION

The present invention is directed, in general, to wireless networking and, more specifically, to a system and method for discriminating radar transmissions from wireless network transmissions and wireless network having radar-avoidance capability.

BACKGROUND OF THE INVENTION

One of the fastest growing technologies over the last few years has been wireless local area network (WLAN) devices based on the Institute of Electrical and Electronic Engineers (IEEE) 802.11b standard, commonly known as "Wi-Fi." The 802.11b standard uses the 2.4 GHz frequency of the electromagnetic spectrum and allows users to transfer data at speeds up to 11 Mbit/sec.

However, a complementary WLAN standard (IEEE 802.11a) is now available that specifies how WLAN equipment has to operate on frequencies between 5 GHz and 6 GHz (the "5 GHz band"). The 802.11a standard significantly expands the capacity of WLANs, allowing data to be exchanged at even faster rates (up to 54 Mbit/sec), but at a shorter operating range than 802.11b.

Unfortunately, the Department of Defense (DOD) operates a large number of radar systems in the 5 GHz band. The DOD has become concerned that the increasing adoption of 802.11a wireless devices will, as time goes on, cause increasing interference between the pulses that make up the signals produced by the radar systems and the pulses produced by the wireless devices. Its concern is particularly acute in today's security-conscious environment.

To accommodate both radar and 802.11a WLAN wireless devices in the same 5 GHz band, the WLAN industry developed a concept called "dynamic frequency selection," or DFS. DFS calls for wireless devices to detect the presence of radar signals. When a radar signal is detected on a particular channel, the wireless devices are to switch automatically to another channel to avoid interfering with the radar signal. DFS would appear in theory to yield an acceptable sharing of the 5 GHz band.

However, several problems have arisen in prior art implementations of DFS. First, switching sensitivity is a serious issue. If a particular implementation of DFS provides good noise rejection, switching may occur too slowly in response to a real radar transmission, resulting in undue interference. However, if the noise rejection is reduced, switching may occur in response to noise that appears to be a real radar transmission. The resulting needless channel switch reduces the efficiency with which user data is transmitted through the WLAN, and therefore reduces its effective bandwidth.

Second, DFS can only be undertaken in a wireless device when it is receiving, not when it is transmitting, since its receiver is effectively disabled during that time. Therefore, radar signals will almost certainly go undetected when the wireless device is transmitting, increasing the risk of unwanted interference to radar systems.

Fourth, some radar systems transmit the pulses of their radar signals at a low rate. If a wireless device misses detecting even one pulse, the time interval between the two adjacent pulses may be too great for the wireless device properly to identify the radar transmissions. Again, the radar transmissions may go undetected.

Finally, the position of the 802.11a wireless device with respect to the radar may be such that radar transmissions received by the wireless device are of enhanced or diminished amplitude. The transmissions may therefore be misinterpreted as noise and ignored. In a similar vein, multipath interference may transform the pulses of the radar transmission, rendering them unrecognizable as such by the 802.11a wireless device. Again, the extent to which noise is rejected has some bearing on noninterpretation or misinterpretation of radar transmissions. In either case, the risk is that channels would not be switched quickly enough, and interference results.

While the IEEE does, in 802.11h, provide a protocol that allows radar-monitoring data to be collected from wireless devices, it sets forth no method for actually monitoring radar transmissions, nor does it specify how the radar-monitoring data should be analyzed to determine whether a radar is in operation. What is needed in the art is a comprehensive, practical DFS implementation that effectively rejects noise, but quickly and correctly identifies true radar transmissions. What is further needed in the art is a DFS implementation that is operable even when a particular wireless device is transmitting.

SUMMARY OF THE INVENTION

To address the above-discussed deficiencies of the prior art, the present invention provides for use in a wireless network (of which a WLAN is one type), systems and methods for identifying radar signals and for giving the wireless network a radar-avoidance capability.

In one embodiment, the system for identifying radar signals includes a pulse analyzer, associated with a wireless device, configured to make a determination whether a received pulse is a radar pulse and not a wireless network pulse. The system further includes a pulse reporter configured to generate, if the determination is positive, a report thereof for transmission over the wireless network.

In one embodiment, the method of identifying radar signals includes making, at a wireless device in the wireless network, a determination whether a received pulse is a radar pulse and not a wireless network pulse. The method further includes generating, if the determination is positive, a report thereof for transmission over the wireless network.

In one embodiment, the system for giving the wireless network a radar-avoidance capability includes a report receiver configured to receive reports via the wireless network from wireless devices thereof. The system further includes a report analyzer, associated with the report receiver, configured to analyze relationships among the reports to make a determination whether a sequence of radar pulses exists and, if the determination is positive, generate a radar transmission alert.

Therefore, the present invention introduces the broad concept of employing the wireless network as a whole (or at least a number of its wireless devices) to gather radar pulse data and using a node in the wireless network to analyze the data centrally. Using multiple wireless devices overcomes the many problems described above (e.g., transmit blackout, multipath interference, noise and amplitude variation) that result when only one wireless device is used. Once it has been determined that radar transmissions are present on the wireless network's frequency, the wireless network responds by changing frequency to avoid the radar.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
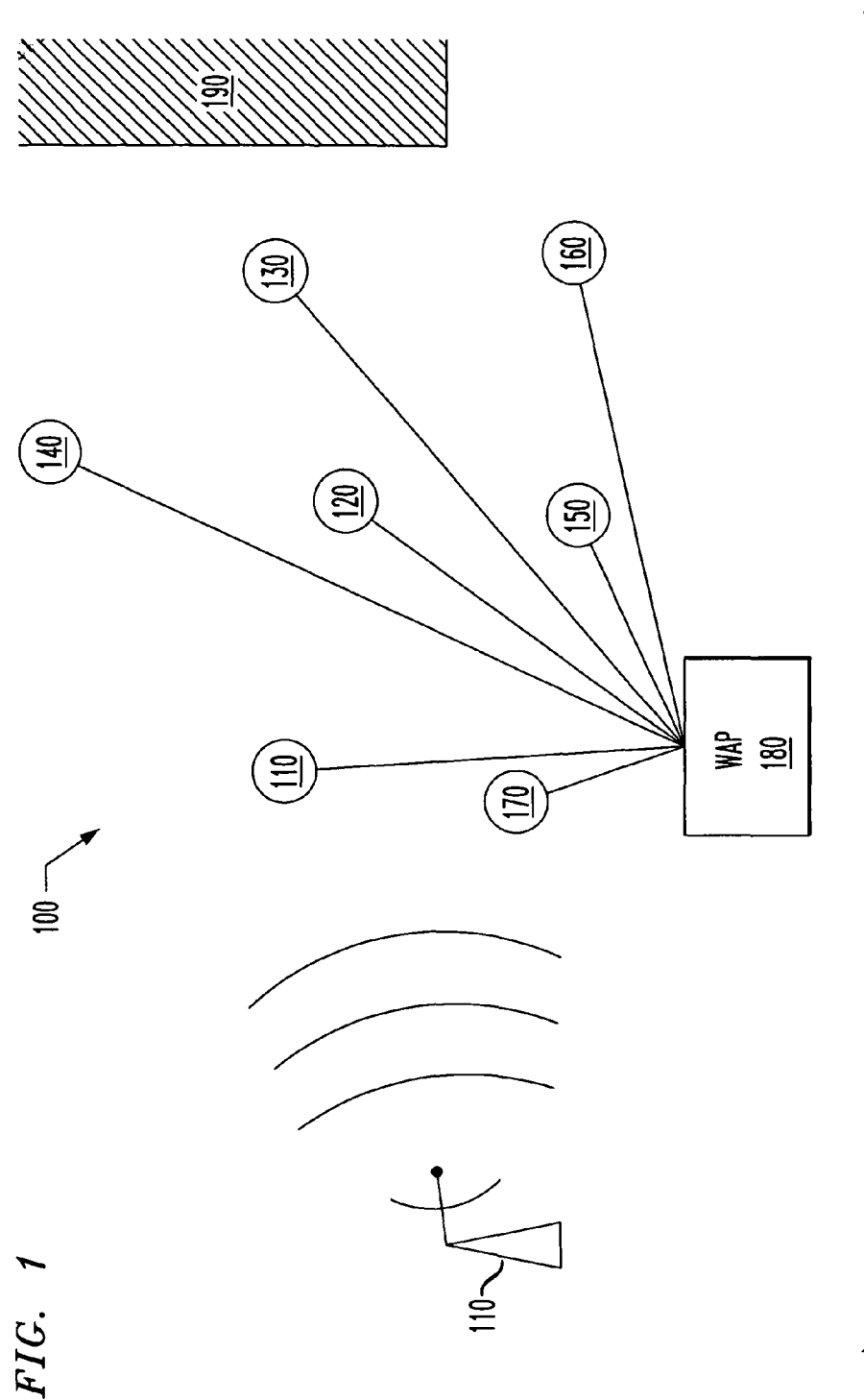
FIG. 1 illustrates a schematic diagram of a WLAN operating in an environment in which a radar system is also operating.

Referring initially to FIG. 1, illustrated is a schematic diagram of a WLAN, generally designated 100, operating in an environment in which a radar system 110 is also operating. The WLAN 100 includes a plurality of wireless devices 120, 130, 140, 150, 160, 170. The WLAN 100 is further illustrated as including a Wireless Access Point (WAP) 180 that provides a bridge between the various wireless devices 120, 130, 140, 150, 160, 160 of the WLAN 100 and an external network (not shown), such as the Internet. Finally, a reflective surface 190 is schematically shown for a purpose that will soon become evident.

During operation of the WLAN 100, the wireless devices 120, 130, 140, 150, 160, 170 transmit and receive packets of user and control data. Since the wireless devices 120, 130, 140, 150, 160, 170 conform to the IEEE 802.11a standard, the packets are transmitted between the wireless devices 120, 130, 140, 150, 160, 170 and the WAP 180 using coded Orthogonal Frequency Division Multiplexing (OFDM) symbols that take the form of pulses that, in turn, modulate a carrier wave of a certain frequency. The frequency of the carrier wave defines the channel at which the wireless devices 120, 130, 140, 150, 160, 170 are operating.

From the perspective of the Open Systems Interconnect (OSI) network model, the OFDM symbols are coded, transmitted, received and decoded at the physical, or "PHY," layer. All other data manipulation occurs at higher layers.

For purposes of illustration, it is now assumed that the radar system 110 begins to transmit at a frequency that approximates the frequency of the channel at which the WLAN 100 is operating. Radar pulses emanate from the radar system 110 and begin to traverse the WLAN's space. The result, as amply described in the Background of the Invention section above, is that the continued operation of the WLAN 100 on its current channel begins to interfere with the receiver of the radar system 110.

The challenge at this point for the WLAN 100 is to detect and correctly identify the radar pulses and switch channels to halt further interference. Each of the wireless devices 120, 130, 140, 150, 160, 170 could try to detect and identify the radar pulses independently but, as described above, significant barriers exist to this approach.

To illustrate by way of example, the wireless device 170 is relatively close to the radar system 110. Radar pulses may appear enhanced in amplitude or distorted by virtue of their relative power. In contrast, the wireless device 160 is relatively far from the radar system 110. Radar pulses may appear diminished in amplitude and be subject to being treated as noise. Still further in contrast, the wireless device 130 is proximate the reflective surface 190. Not only does the wireless device 130 receive radar pulses directly from the radar system 110, it also receives delayed, attenuated and probably distorted reflections of the radar pulses by virtue of their interaction with the reflective surface 190. It would be quite difficult to provide a common set of known characteristics (e.g., time interval, pulsewidth or amplitude) to the wireless devices 120, 130, 140, 150, 160, 170 that would allow them each reliably to distinguish numbers of radar pulses from wireless network pulses sufficient to reach a reliable determination, since their perceptions of the radar pulses differ.

Compounding the challenge is that the wireless devices 120, 130, 140, 150, 160, 170 are unable to detect radar pulses while they are transmitting, so the wireless devices 170, 160, 130 cannot be assumed to have complete data from which to make their respective determinations.

As stated above, the present invention takes a different approach, calling for the various wireless devices 120, 130, 140, 150, 160, 170 to identify as many radar pulses as reasonably possible given their circumstances and to pool their findings such that a more comprehensive analysis can be performed centrally on a larger body of collective data. Embodiments of the present invention will now be described to describe this process in greater detail.

Figure 2:
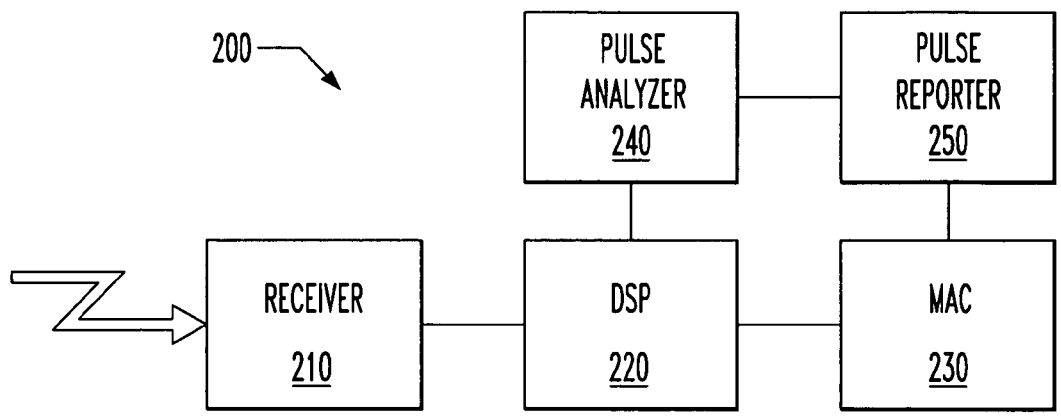
FIG. 2 illustrates a block diagram of one embodiment of a system for identifying radar signals constructed according to the principles of the present invention.

Turning now to FIG. 2, illustrated is a block diagram of one embodiment of a system, generally designated 200, for identifying radar signals constructed according to the principles of the present invention. The illustrated embodiment of the system 200 embodied in each of the wireless devices 120, 130, 140, 150, 160, 170. As such, the system 200 has access to and employs a receiver 210, a digital signal processor (DSP) 220 and a media access controller (MAC) 230 already existing in each of the wireless devices 120, 130, 140, 150, 160, 170. Those skilled in the pertinent art understand that, as conventional OFDM symbols are received into a particular wireless device, its receiver amplifies, demodulates and filters the received symbols; its DSP decodes the symbols to yield a bitstream; and its MAC applies protocols to and buffers the bitstream so it can be transferred to the remainder of the wireless device.

The system 200 includes a pulse analyzer 240. The pulse analyzer 240 is configured to make a determination whether a received pulse is a radar pulse and not a wireless network pulse. As such, the pulse analyzer 240 compares the received pulse to at least one known characteristic. In the illustrated embodiment, the pulse analyzer 240 is embodied as a sequence of instructions executable in the DSP 220 and employs programmable characteristics that distinguish the radar pulse, the wireless network pulse and noise from one another.

If the pulse analyzer 240 determines that the received pulse is noise, it causes the received pulse to be filtered out. If the pulse analyzer 240 determines that the received pulse is a wireless network pulse, it causes the received pulse to be decoded in the DSP 220 and passed on to the MAC 230 for standard processing. If the pulse analyzer 240 makes a determination that the received pulse is a radar pulse, it signals a pulse reporter 250.

The pulse reporter 250 is coupled to the pulse analyzer 240 and is configured to generate, if the determination is positive, a report thereof for transmission over the WLAN (100 of FIG. 1). More specific to the illustrated embodiment, the pulse reporter 250 is embodied in the MAC 230, allowing it to generate a packet of proper protocol containing the report. One such a packet may contain one or more of these reports.

The report includes at least a timestamp derived from a common timebase. The fact that the MAC 230 already has a real time clock synchronized with other real time clocks in the WLAN (100 of FIG. 1) advantageously allows it to provide the timestamp. In the illustrated embodiment, the timestamp indicates the onset (arrival) time of the pulse. The report of the illustrated embodiment further includes a pulsewidth which may prove useful in later analysis. The report can also include pulse amplitude, frequency, phase or any other characteristic that may be deemed useful in a particular implementation of the present invention.

Accordingly, the MAC 230, under control of the pulse reporter 250, generates the report and causes the report to be destined for a "central aggregation node" in the WLAN (100 of FIG. 1). A number of these reports may be combined and transmitted in one transmission. In the illustrated embodiment, the central aggregation node is the WAP 180 of FIG. 1. Those skilled in the art will readily realize, however, that this need not be the case.

Figure 3:
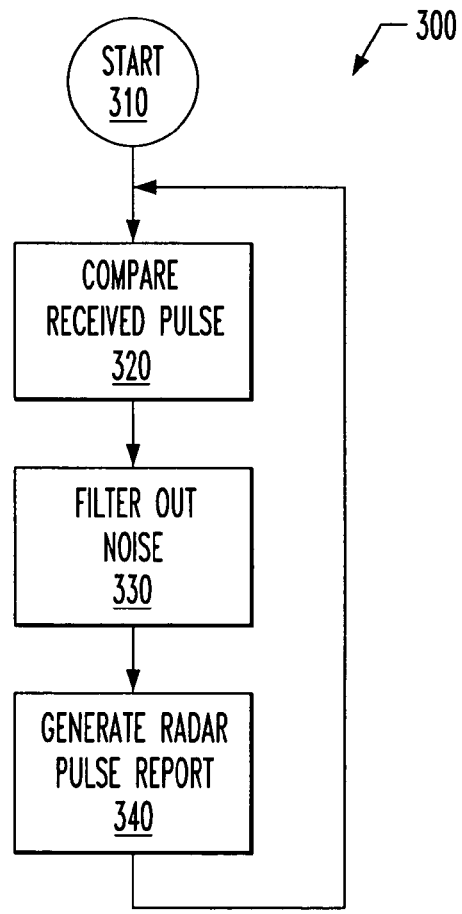
FIG. 3 illustrates a flow diagram of one embodiment of a method of identifying radar signals carried out according to the principles of the present invention.

Turning now to FIG. 3, illustrated is a flow diagram of one embodiment of a method, generally designated 300, of identifying radar signals carried out according to the principles of the present invention. The method 300 begins in a start step 310, wherein it is desired to monitor pulses to determine whether they may indicate the presence of a radar system on the channel being used.

The method proceeds to a determination of whether a received pulse is a radar pulse and not a wireless network pulse (and perhaps not noise either). Accordingly, in a step 320, the received pulse is compared to at least one known characteristic (e.g., time interval, pulsewidth or amplitude). In the illustrated embodiment, time interval and pulsewidth are the employed characteristics and are programmable such that the sensitivity of the WLAN (100 of FIG. 1) can be altered. If the received pulse is determined to be noise, the received pulse is filtered out in a step 330.

Next, in a step 340, if the determination that the received pulse is a radar pulse and not a wireless network pulse is positive, a report of that fact is generated for transmission over the WLAN (100 of FIG. 1). In the illustrated embodiment, the report is sent to the WAP (180 of FIG. 1), which serves as a central aggregation node for reports from all wireless devices of the WLAN (100 of FIG. 1). Those skilled in the pertinent art will recognize that the report sent to the WAP (180 of FIG. 1) may be aggregated with other reports into a single message over the WLAN (100 of FIG. 1). At this point, it is assumed that monitoring of received pulses continues, subject to periods during which the wireless device is transmitting data. Accordingly, the method 300 doubles back to the step 310.

Turning back briefly to FIG. 1, it should be assumed at this point that, given that the radar system 110 of FIG. 1 is active on their channel, the various wireless devices 120, 130, 140, 150, 160, 170 are transmitting various reports to the WAP 180 concerning suspected radar pulses they have received therefrom. The term "suspected" is used, because the wireless devices 120, 130, 140, 150, 160, 170 may have incorrectly determined some noise to be radar pulses and caused spurious reports to have been transmitted. Nonetheless, such spurious reports will be dealt with in a manner that will become apparent.

Figure 4:
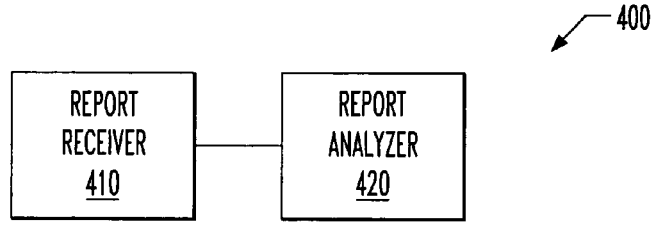
FIG. 4 illustrates a block diagram of one embodiment of a system for giving the WLAN of FIG. 1 a radar-avoidance capability constructed according to the principles of the present invention.

Turning now to FIG. 4, illustrated is a block diagram of one embodiment of a system, generally designated 400, for giving the WLAN of FIG. 1 a radar-avoidance capability constructed according to the principles of the present invention. The illustrated embodiment of the system 400 is embodied as a sequence of software instructions executable in a general purpose processor associated with the WAP 180. Those skilled in the pertinent art will understand that other embodiments and locations for the system 400 fall within the broad scope of the present invention.

The system 400 includes a report receiver 410. The report receiver 410 is configured to receive reports of received radar pulses via the WLAN (100 of FIG. 1) from wireless devices thereof, (e.g., the wireless devices 120, 130, 140, 150, 160, 170). The illustrated embodiment of the report receiver 410 assembles the data contained in the reports into a table (not shown, but represented schematically in FIGS. 5A through 5E) in timestamp order to facilitate analysis.

The system 400 further includes a report analyzer 420. The report analyzer 420 is associated with the report receiver 410 and is configured to analyze relationships among the reports to make a determination whether a sequence of radar pulses exists. If the determination is positive, the report analyzer 420 generates a radar transmission alert to be employed by the WLAN (100 of FIG. 1) in switching channels to avoid the radar system (110 of FIG. 1). Upon receiving the radar transmission alert, the WLAN (100 of FIG. 1) responds by ordering a channel switch, and the wireless devices (e.g., the wireless devices 120, 130, 140, 150, 160, 170 of FIG. 1) respond to effect the switch.

As described above, the reports of the illustrated embodiment include timestamps derived from a common timebase and widths of the radar pulses (pulsewidths). Accordingly, the illustrated embodiment of the report analyzer 420 analyzes time intervals between ones of the radar pulses and further analyzes the pulsewidths.

More specifically, the report analyzer identifies X successive repetitions of a given time interval between ones of the radar pulses subject to a maximum of Y missing radar pulses and within a tolerance of Z microseconds, where X, Y and Z are programmable variables provided to the system 400. Thus X, Y and Z together determine the sensitivity of the system 400. Those skilled in the pertinent art will understand that other or further variables may be employed to advantage to identify radar signals.

Moreover, the report analyzer 420 identifies a maximum of N time intervals between ones of the radar pulses, where N is a programmable variable. N thus determines how thorough the search for like time intervals is to be before calling the search off and beginning to search for wholly different time intervals.

Some details regarding the analysis of specific radar pulses will now be illustrated. FIG. 5A through 5E illustrate exemplary graphical representations of pulses that the system 400 of FIG. 4 can analyze to identify radar pulse sequences.

Figure 5A:
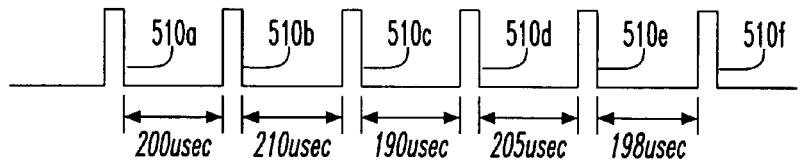
FIG. 5A through 5E illustrate exemplary graphical representations of pulses that the system of FIG. 4 can analyze to identify radar pulse sequences.

FIG. 5A illustrates six pulses 510*a*, 510*b*, 510*c*, 510*d*, 510*e*, 510*f* of substantially constant width and periodicity, but with some variation. (Keep in mind that these pulses 510*a*, 510*b*, 510*c*, 510*d*, 510*e*, 510*f* may have been collected from various and even multiple wireless devices.) As FIG. 5A indicates, the interval between pulses 510*a* and 510*b* is 200 μsec. The interval between pulses 510*b* and 510*c* is 210 μsec. The interval between pulses 510*c* and 510*d* is 190 μsec. The interval between pulses 510*d* and 510*e* is 205 μsec. Finally, the interval between pulses 510*e* and 510*f* is 198 μsec. If the given time interval is 200 μsec and the tolerance Z is 10 μsec, the report analyzer 420 will regard the six pulses 510*a*, 510*b*, 510*c*, 510*d*, 510*e*, 510*f* as belonging to a sequence of radar pulses. The report analyzer 420 may not regard the sequence as complete, however, if X, the number of successive repetitions of a given time interval required to constitute a valid radar pulse sequence, is greater than six.

Figure 5B:
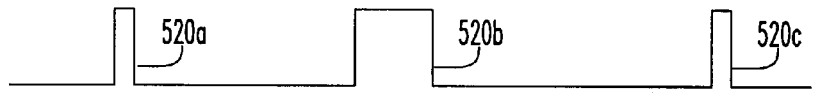

FIG. 5B illustrates three pulses 520*a*, 520*b*, 520*c* separated by arguably similar time intervals. However, the pulse 520*b* is quite evidently wider than the pulses 520*a*, 520*c*. In the illustrated embodiment, the pulse 520*b* would be disregarded as noise. A programmable variable W may achieve the purpose of defining the maximum width variation tolerance.

Figure 5C:
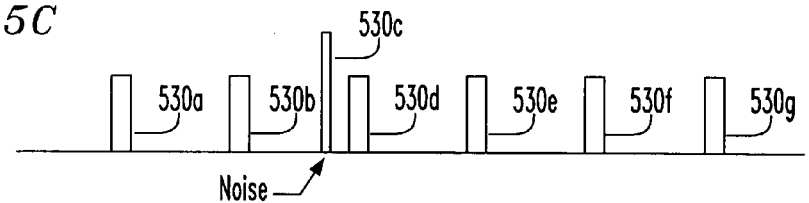

FIG. 5C illustrates seven pulses 530*a*, 530*b*, 530*c*, 530*d*, 530*e*, 530*f*, 530*g*. The pulse 530*c* stands out from the rest as being the only one of its amplitude. In the illustrated embodiment, the pulse 530*c* would be disregarded as noise. A programmable variable A may achieve the purpose of defining the maximum amplitude variation tolerance.

Figure 5D:
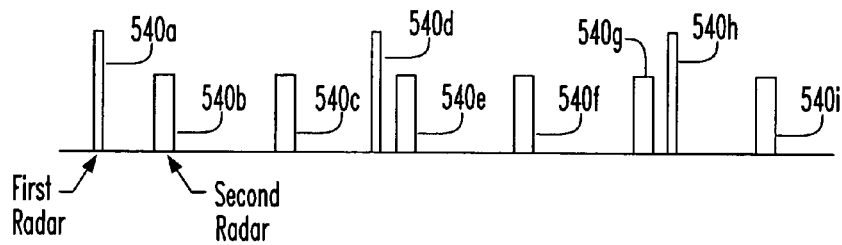

FIG. 5D illustrates nine pulses 540*a*, 540*b*, 540*c*, 540*d*, 540*e*, 540*f*, 540*g*, 540*h*, 540*i*. It is apparent that the pulses 540*a*, 540*d*, 540*h* potentially belong (subject to X, Y and Z) to a first sequence of radar pulses (emanating from what appears to be a first radar system) and the remainder of the pulses 540*b*, 540*c*, 540*e*, 540*f*, 540*g*, 540*i* potentially belong (subject again to X, Y and Z) to a second sequence of radar pulses (emanating from what appears to be a second radar system). FIG. 5D illustrates the ability of the report analyzer 420 to discern multiple radar pulse sequences, subject to N.

Figure 5E:

FIG. 5E illustrates the consequence of Y. Five pulses 550*a*, 550*b*, 550*c*, 550*d*, 550*e* are evident, but the time interval separating the pulses 550*b* and 550*c* appears to be twice those separating the others. Assuming that Y is set to at least one, the double time interval will be assumed to be missing a pulse, and the five pulses 550*a*, 550*b*, 550*c*, 550*d*, 550*e* actually in evidence will be candidates (subject to X and Z) for a potential sequence of radar pulses.

Figure 6:
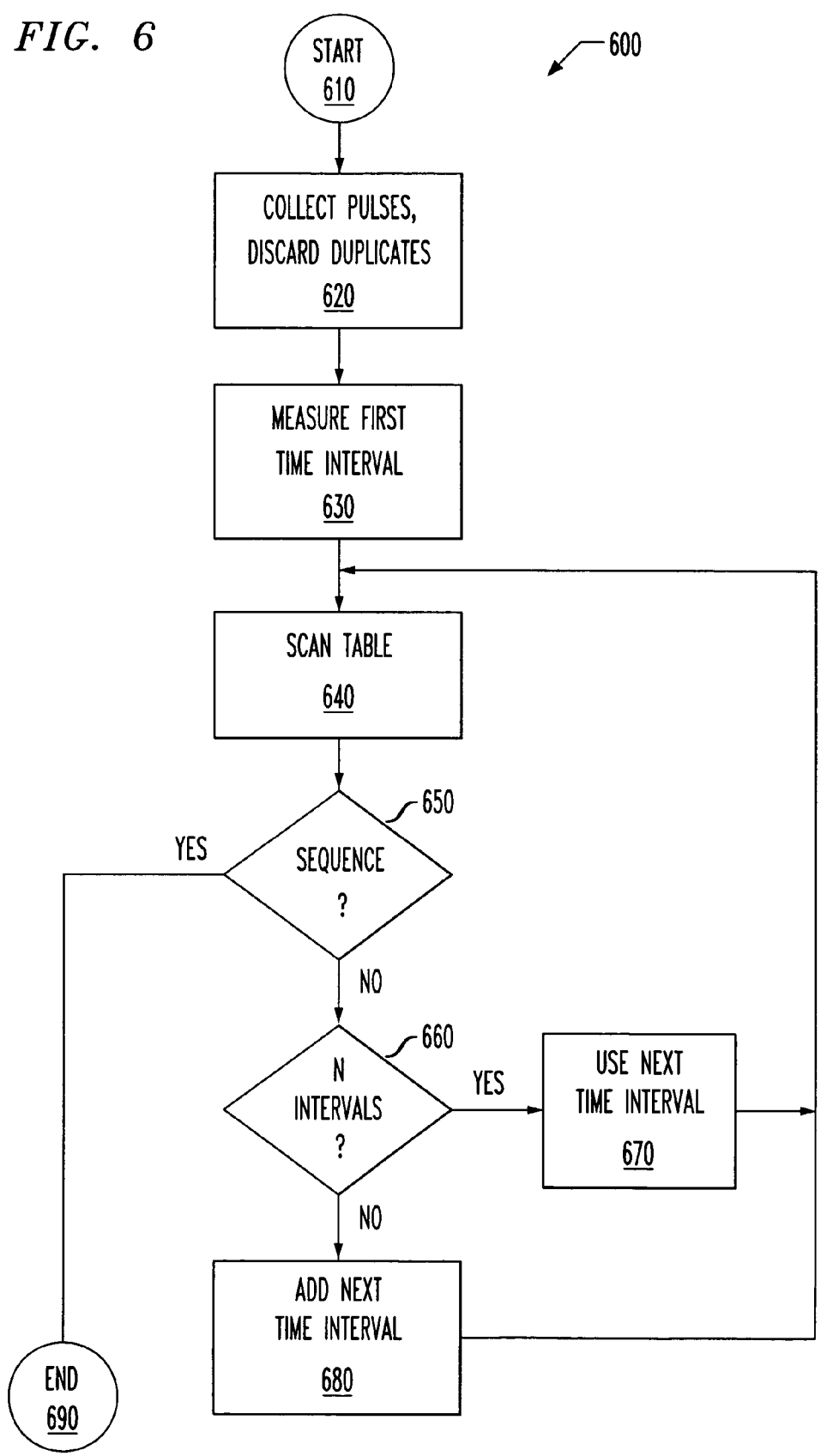
FIG. 6 illustrates a flow diagram of one embodiment of a method of giving the WLAN of FIG. 1 a radar-avoidance capability carried out according to the principles of the present invention.

Turning now to FIG. 6, illustrated is a flow diagram of one embodiment of a method, generally designated 600, of giving the WLAN 100 of FIG. 1 a radar-avoidance capability carried out according to the principles of the present invention. The method 600 begins in a start step 610, wherein it is desired to collect up and centrally analyze pulses in an effort to detect radar signals.

The method 600 proceeds to a step 620, in which data pertaining to pulses determined by various wireless devices to be radar pulses are collected into a table and pulses that are apparent duplicates (the same pulse determined by multiple wireless devices) are discarded. Next, in a step 630, the first time interval in the table is measured.

Then, in a step 640, the table is scanned to find a sequence of at least X successive repetitions of the time interval. A sequence is still considered to be valid even if Y pulses are missing. When comparing time intervals, a tolerance of Z μsec is allowed.

Next, in a decisional step 650, it is determined whether a sequence has been found in the table. If YES, then the method 600 ends in an end step 690. If NO, the method 600 proceeds to a decisional step 660 in which it is determined whether N such time intervals have been found. If YES, the search for like time intervals ceases, and the next time interval in the table is measured in a step 670. Processing then continues in the step 640. If NO, the method proceeds to a step 680 in which the time interval in the table is incremented. Processing then continues in the step 640.

Although the present invention has been described in detail, those skilled in the art should understand that they can make various changes, substitutions and alterations herein without departing from the spirit and scope of the invention in its broadest form.

What is claimed is:

1. For use in a wireless network, a method of identifying radar signals, comprising:
   collecting data at a central aggregation node of said wireless network, said data pertaining to pulses determined by wireless devices of said wireless network to be radar pulses;
   discarding duplicate portions of said data for a pulse determined by multiple of said wireless devices to be a suspected radar pulse;
   determining, based on remaining data after said discarding, if a radar sequence exists by identifying X successive repetitions of a given time interval between ones of said pulses in said remaining data subject to a maximum of Y missing pulses and within a tolerance of Z microseconds;
   determining if an additional time interval exists in said data when determining a radar sequence does not exist based on said given time interval; and
   if an additional time interval does not exist, incrementing said given time interval and determining if a radar sequence exists based on said incremented time interval.

2. The method as recited in claim 1 further comprising, if an additional time interval exists, determining if a radar sequence exists based on said additional time interval.

3. The method as recited in claim 1 wherein said data includes timestamps associated with said pulses and said determining if a radar sequence exists employs said timestamps.

4. The method as recited in claim 1 wherein said data is collected into a table at said central aggregation node.

5. An apparatus identifying radar signals in a wireless network, comprising:
   a report receiver configured to collect data of suspected radar pulses from wireless devices of said wireless network, said data pertaining to pulses determined by said wireless devices to be radar pulses; and
   a report analyzer, associated with said report receiver, configured to discard duplicate portions of said data for a pulse determined by multiple of said wireless devices to be a suspected radar pulse and determine, based on remaining data after said discard, if a radar sequence exists by identifying X successive repetitions of a given time interval between ones of said pulses in said remaining data subject to a maximum of Y missing pulses and within a tolerance of Z microseconds, wherein said report analyzer is further configured to determine if an additional time interval exists in said data when determining a radar sequence does not exist based on said given time interval and if an additional time interval does not exist, increment said given time interval and determine if a radar sequence exists based on said incremented time interval.

6. The apparatus as recited in claim 5 wherein said report analyzer is further configured to generate a radar transmission alert for said wireless devices if said determination is positive.

7. The apparatus as recited in claim 5 wherein said data includes timestamps derived from a common timebase and widths of said radar pulses, wherein said report analyzer analyzes time intervals between ones of said radar pulses and widths of ones of said radar pulses.

8. The apparatus as recited in claim 5 wherein said report analyzer identifies a maximum of N time intervals between ones of said radar pulses.

9. The apparatus as recited in claim 5 wherein said wireless network conforms to IEEE 802.11a and said sequence is associated with a radar operating in a 5 GHz band.

10. The apparatus as recited in claim 5 wherein said report analyzer is further configured to determine, if an additional time interval exists, if a radar sequence exists based on said additional time interval.

11. The apparatus as recited in claim 5 wherein said data includes timestamps associated with said pulses and said report analyzer is configured to determine if a radar sequence exists employing said timestamps.

12. The apparatus as recited in claim 5 wherein said report receiver collects said data into a table.

13. The apparatus as recited in claim 5 wherein said apparatus is a wireless access point of said wireless network.

14. The method as recited in claim 1 wherein X, Y and Z are programmable variables.

15. The apparatus as recited in claim 5 wherein X, Y and Z are programmable variables.

16. The apparatus as recited in claim 8 wherein N is a programmable variable.

* * * * *